April 20, 1965   F. L. BEEBEE   3,178,972
DEVICE FOR CUTTING GROOVES

Filed May 2, 1961   2 Sheets-Sheet 1

FREDERICK L. BEEBEE,
INVENTOR.

BY Albert M Herzig

ATTORNEY

April 20, 1965
F. L. BEEBEE
3,178,972
DEVICE FOR CUTTING GROOVES
Filed May 2, 1961
2 Sheets-Sheet 2
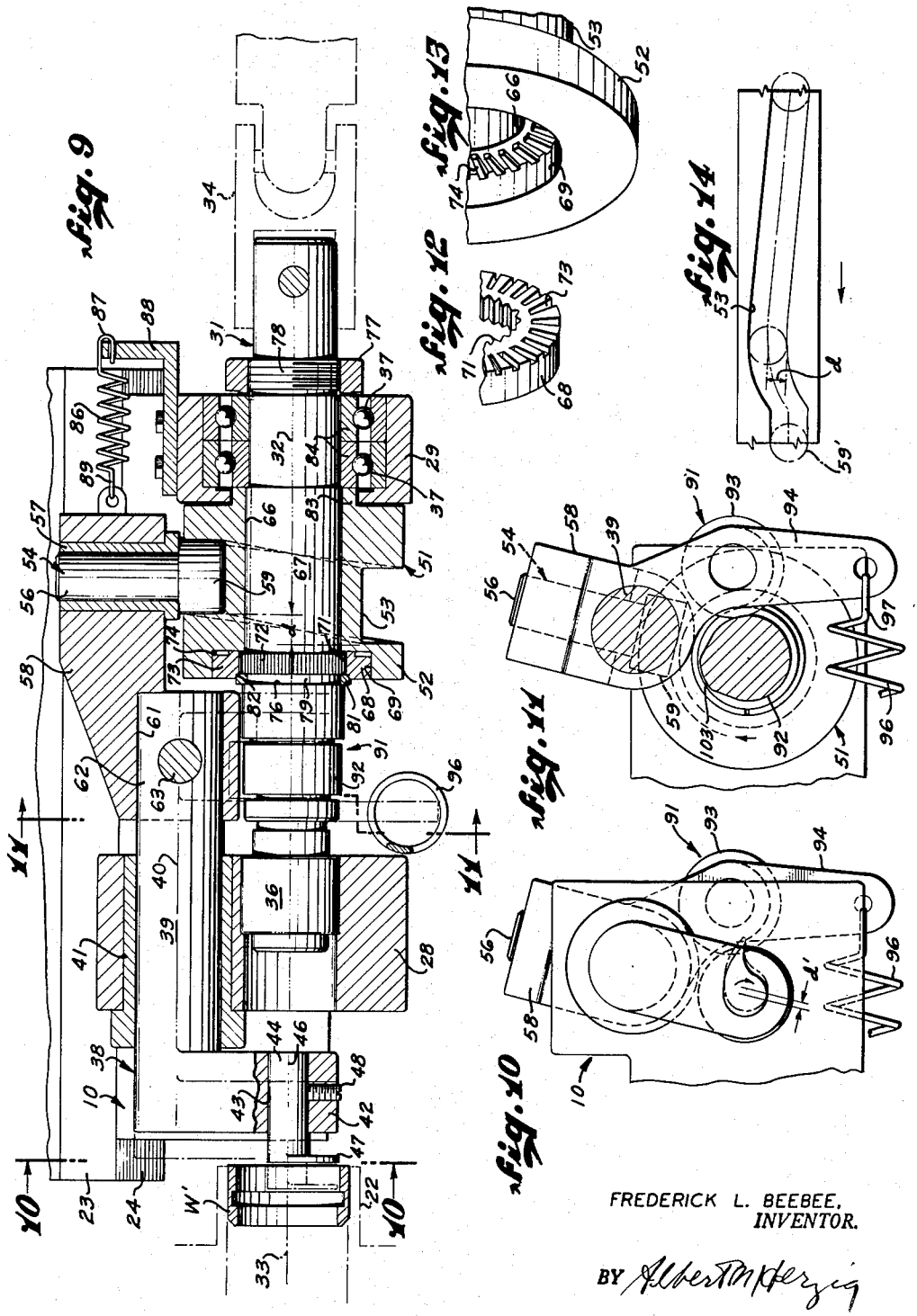
FREDERICK L. BEEBEE,
INVENTOR.
BY *Albert M Herzig*
ATTORNEY

United States Patent Office 3,178,972
Patented Apr. 20, 1965

3,178,972
DEVICE FOR CUTTING GROOVES
Frederick L. Beebee, La Canada, Calif., assignor to
The Deutsch Company
Filed May 2, 1961, Ser. No. 107,139
7 Claims. (Cl. 82—5)

This invention relates to a cutting device particularly adapted for forming grooves and more particularly to a device securable to an automatic machine for adapting the machine to control a tool in response to the normal actuation of the machine to form a continuous, interrupted, or repeated groove on a cylindrical surface of a cylindrical workpiece.

The device of this invention is particularly adaptable for use on automatic machines such as multiple spindle bar machines in which various operations are performed on a workpiece as it is progressed from one spindle position to a subsequent spindle position, each spindle bearing a different tool to perform a different function when the workpiece is progressed to its spindle position.

In the past, circumferentially spaced angle grooves formed on the interior or exterior of a cylindrical workpiece have been very difficult and time-consuming to perform, requiring detailed and skilled manual operations with the resultant increased cost of manufacture. The instant invention, on the other hand, adapts an automatic machine to perform a single function comprising a compound movement so as to make possible mass production of the finished product at low cost.

The instant invention is easily and readily securable to a standard automatic machine to adapt the machine to perform the required function as one of the operations performed on the part during the cyclic, progressive movement of the spindles of the machine.

It is therefore among the objects of this invention to provide a new and improved device securable to an automatic machine and the like for adapting the machine to perform a predetermined function, such as a continuous, interrupted, or repetitive internal or external angular groove on a cylindrical workpiece, which is not normal to the machine.

Another object of this invention is to provide a new and improved device which is securable to existing tool holding means of the machine and capable of being driven by the existing power drive means thereof.

A further object of this invention is to provide a new and improved device for an automatic machine and the like which is continuously operable for cyclic and intermittent cutting operations of a tool supported thereby.

Yet another object of this invention is to provide a new and improved device for an automatic machine and the like which is adjustable for adjusting the cyclic operation thereof in relationship to the rotation of the workpiece and in spaced relationship to the workpiece itself for predetermining precise cutting operations thereon.

A general object of this invention is to provide a new and improved device for an automatic machine and the like which overcomes disadvantages of prior means and methods heretofore intended to accomplish generally similar purposes.

These and other objects of this invention will be more apparent from the following detailed description, drawings and appended claims.

Figure 1:
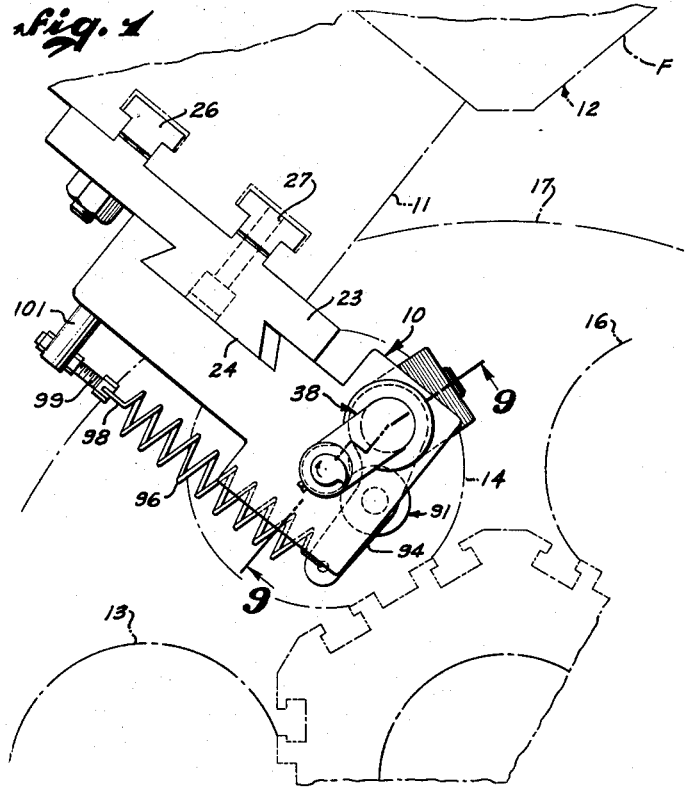
FIGURE 1 is an end view of the device of this invention, illustrated in relationship to a standard multiple spindle bar machine.
Figure 2:
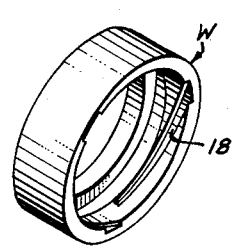
FIGURE 2 is a perspective view of an example of a workpiece illustrated in a finished condition.
Figure 8:
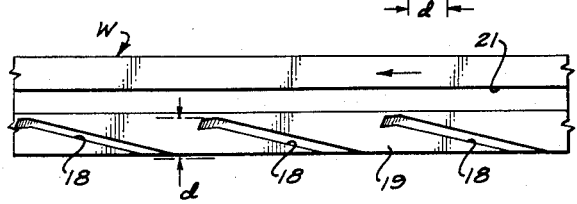

FIGURES 4–7, inclusive, are diagrammatic views illustrating in detail the steps of operation of the device of this invention;

FIGURE 8 is a diagrammatic plan view illustrating the interior of the workpiece in flat detail;

FIGURE 9 is a cross-sectional view as taken substantially along the line 9—9 of FIGURE 1;

FIGURE 10 is a cross-sectional view as taken substantially along the line 10—10 of FIGURE 9;

FIGURE 11 is a cross-sectional view as taken substantially along the line 11—11 of FIGURE 9;

FIGURES 12 and 13 are enlarged fragmentary perspective views of an adjustment means of this invention; and FIGURE 14 is a diagrammatic plan view of a cam means functioning as an element of the device.

Referring in detail to the drawings, there is shown by way of illustration, but not of limitation, a new and improved device for an automatic machine and the like, designed and constructed in accordance with this invention and generally referred to by the numeral 10. The device 10 is illustrated herein as being adapted to be secured to a slide carrier 11 mounted on the frame F of the automatic machine, as for example, a multiple spindle bar machine generally designated by the numeral 12 and having a plurality of spindles indicated in broken lines at 13, 14 and 16. The spindle indication at 14 is normally referred to as the No. 3 spindle position of the machine, although it is to be understood that the device 10 may be adapted to perform its function at any desired spindle position which is practicable in the application of the device 10 to a workpiece designated by the letter W. The spindles 13, 14 and 16 and the other three spindles not seen in FIGURE 1, are adapted to be rotated by a spindle carrier 17 and thus to form a workpiece holder so as to progress the spindles to the cutting position so as to progress a workpiece to align with cutters at the various spindle positions to perform progressively various functions to be performed on the workpiece.

Figure 3:
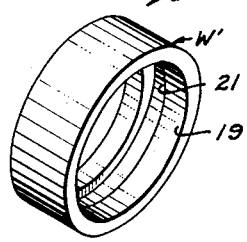
FIGURE 3 is a perspective view of the workpiece of FIGURE 2, illustrated in its original condition, prior to performance of the function of the device of this invention.

As an example, as best seen in FIGURE 3, the raw workpiece W' to which angled intermittent spiral grooves 18 are to be formed may, at prior spindle positions, be formed with an internal cylindrical surface 19 and, for example, an internal annular groove 21 in a plane perpendicular to the longitudinal axis of the workpiece. As best seen in FIGURE 9, the workpiece W' is supported in a workpiece holding means indicated by the broken lines 22, of conventional design and which may include a workpiece feeding device for automatically ejecting a finished workpiece at the completion of all operations and pushing a new workpiece W' into position for repetition of the cycle of operations.

It is to be further understood that although reference herein is made to the adaptation to an automatic spindle bar machine having drive means which can be applied by the inherent gearing thereof to drive the workpiece and the device 10 in predetermined ratio of drive, the instant invention may be applied to a non-automatic machine wherein a workpiece and the device 10 may be separately operated by separate drive means synchronized to perform the function desired. The adaptation of the instant invention to a non-automatic machine is considered as a mechanical expedient; therefore, the device 10 will be herein described as adapted to an automatic machine.

The body 10 is adjustably secured to the slide carrier 11 by a slide 23 having a dovetail connection 24 with the body, the slide 23 being clamped to the slide carrier 11 as at 26 and 27. It will therefore be clearly seen that the body 10 is adjustable linearly relative to the slide 23. In turn, the slide carrier 11 is adjustable in a direction transverse to the action of the slide 23 so as to make the body 10 adjustable in a transverse direction. The slide carrier 11 is a conventional portion of the machine and will therefore not be herein further described.

The body 10 includes a pair of spaced transverse lugs 28 and 29 in which a shaft 31 is rotatably mounted. The axis of the shaft 31, designated by the numeral 32, is alignable with the axis of the workpiece W or W', designated by the numeral 33, by the dovetail 24 and the adjustment of the slide carrier 11 secured to the frame of the machine 12. The shaft 31 is adapted to be driven by the drive means (not shown) of the machine 12 by a universal or other connector designated by the broken lines 34 to drive the shaft 31 at a predetermined speed. The shaft 31 is supported in the lugs 28 and 29 by low friction bearings 36 and 37, respectively.

A tool holding means, generally designated by the numeral 38 is rotatably supported on the body 10. The tool holding means 38 includes a shank 39 rotatably disposed in spaced parallel relationship to the shaft 31, in a bearing sleeve 41 of the lug 28. An arm 42 is fixed to the shank 39 and has a bore 43 extending therethrough in which a cutter tool 44 is removably secured. The longitudinal axis 46 of the tool 44 is in spaced parallel relationship to the axis 40 of the shank 39 so as to be in spaced parallel relationship to the axis of the shaft 31. The tool 44 includes an outwardly extending cutting edge or flange 47 to be engaged with the workpiece W' as will be hereinafter described.

The tool holding means 38 is movable in the bearing 41 for linear movement back and forth so as to intermittently and predeterminately extend it to a predetermined position within the interior of the workpiece W' and to be retracted to a position clear of the workpiece W'. When the tool 44 is extended inwardly of the workpiece W' it is in a position to engage the workpiece for performing a cutting operation. When the tool 44 is retracted, it is in a position clear of the workpiece W' whereby the spindles may be rotated by the spindle carrier 17 to position a new workpiece like W' for a repetition of the cycle of operation.

Initially, as the tool holding means 38 is reciprocated to position the tool 44 in the extended and retracted positions, the shank 39 of the tool holder 38 is rotated about its axis 40 to move the tool 44 transversely and eccentrically relative to the shaft 31 so as to cause the cutter 47 of the tool 44 to engage the workpiece W' during the linear movement.

More specifically, the shank 39 is rotated during the retraction of the tool 44 to cause, by virtue of the rotation of the workpiece W', a spiral groove 18 to be formed on the internal cylindrical surface 19, as will be hereinafter more fully described.

The shank of the tool 44 is non-rotatably secured in the arm 42 of the tool holding means 38 by one or more set screw like 48.

A push-pull first cam means, generally indicated by the numeral 51, is secured to the shaft 31 for rotation therewith and for translating the rotation of the shaft 31 into the back and forth linear movement of the tool holder means 38 to operate the tool 44. The cam means 51 includes a cam sleeve 52 adjustably secured to the shaft 31 in a manner to be hereinafter described and having a linearly offset annular groove 53. A cam follower 54, having a shank 56 rotatably mounted in a bearing 57 of a bracket 58, includes a rotatable or other cam follower end 59 residing in the cam groove 53. The cam follower 59 is preferably secured to the shank 56 by a low friction mounting. The bracket 58 includes a bore 61 in which an end 62 of the shank 39 of the tool means 38 resides. The end 62 is fixed within the bore 61 by a transverse pin 63 extending through the bracket 58 and the end 62, so that, in response to rotation of the cam sleeve 52, the cam follower causes the bracket 58 to move back and forth and, by the pin connection 63, causes the shank 39 to slide back and forth within the bearing 41.

The cam sleeve 52 is adjustably secured to the shaft 31 in the following manner. The cam sleeve 52 has an internal bore 66 slidingly fitting an enlarged cylindrical portion 67 of the shaft 31. An adjustment ring 68 slidingly fits within an annular recess 69 at one end of the sleeve 52, the inner diameter of the ring 68 being serrated as indicated by the numeral 71 in FIGURE 12 and complementary to external serrations 72 formed on shaft 31 (see FIGURE 9) whereby the ring 68 may be circumferentially adjusted relative to the shaft 31 in increments of the circumferential distance of the serrations 71 and 72. The serrations 71 and 72 also serve to key the shaft 31 to the ring 68 to transmit rotation of the shaft 31 to the ring 68. The rotation of the ring 68 is transmitted to the cam sleeve 52 by radial serrations 73 formed in the inner face of the ring 68 meshed with radial serrations 74 formed on an adjacent face of the recess 69 (see FIGURES 12 and 13). The relative position of the cam sleeve 52 to the ring 68 is thereby adjustable by selective engagement of the serrations 73 and 74 while the relative position of the ring 68 to the shaft 31 is adjustable by selective engagement of the serrations 71–72.

By the combination of the serrations 71–72 and 73–74, an extremely fine adjustment is possible between the relative position of the cam sleeve 52 on the shaft 31 to predetermine precisely and accurately the relationship of the linear movement of the tool holding means 38 relative to the rotation of the workpiece W' or W.

The cam sleeve 52 and the ring 68 are held against linear movement relative to the shaft 31 between a shoulder 76 of the shaft 31 and a nut 77 threadably engaging external threads 78 formed on the shaft 31 adjacent to the coupling 34. The shoulder 76 is formed by an annular groove 79 formed in the shaft 31 in which a split ring 81 resides. An annular recess 82 is formed in the ring 68 to retain the split ring 81 in the groove 79 after adjustment has been completed. An end 83 of the sleeve 52, opposed to the recess 69 thereof, abuts the inner races 84 of the bearings 37 mounted in the lug 29. The nut 77 abuts against the external surface of the external race 84 to clamp the races 84, the sleeve 52, the ring 68 and the split ring 82 against the shoulder 76.

To adjust the cam sleeve relative to the shaft 31, the nut 77 may be backed off to permit axial movement of the sleeve 52 to disengage the ring 68 or sufficiently to uncover the split ring 82 which may then be removed to allow initial freedom of the cam sleeve relative to the ring 68. The ring 68 is then rotated relative to the shaft and the cam sleeve 52 is rotated relative to the ring 68 to secure the desired adjustment of the cam sleeve relative to the shaft 31.

A helical spring 86 is connected at one end 87 to a stationary bracket 88 secured as to the lug 29 and at its opposite end 89 to the bracket 58 so as to bias the cam follower 59 into intimate contact with the cam groove 53 and avoid chatter or vibration during the operation of the cam follower 38.

Means are provided for translating rotation of the shaft 31 into rotation of the shank 39 of the tool holding means 38 so as to engage the tool cutter 47 with the workpiece W' to form the groove 18 previously described, the means being a second cam means generally designated by the numeral 91.

The cam means 91 includes a cam surface 92 on the shaft 31, and a cam follower 93 rotatably secured to the bracket 58. The cam follower 93 is cylindrical and is preferably mounted in a low friction manner on an arm 94 secured to or formed integrally with the bracket 58, as best seen in FIGURES 9–11, inclusive. A spring 96 biases the cam follower 93 into contact with the cam surface 92 and has one end 97 secured to the extremity of the arm 94 and an opposite end 98 secured to an adjustable screw 99 mounted as on a stationary post 101 secured to the body 10.

The cam surface 92 includes a rise 103 (see FIGURE 11) adapted to lift the cam follower 93 at a predetermined time relative to the linear movement of the work holder means 38 so as to rotate the shank 39 of the work holder means 38 and thereby cause the cutter 47 to engage the workpiece W'.

Figure 4:
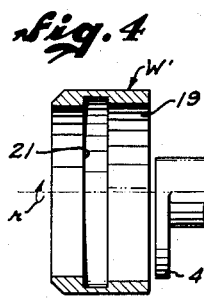
Figure 5:
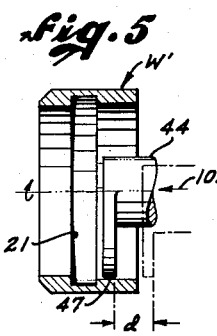
Figure 6:
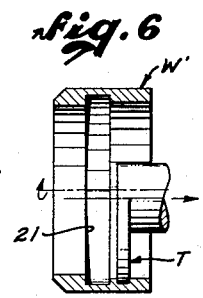
Figure 7:
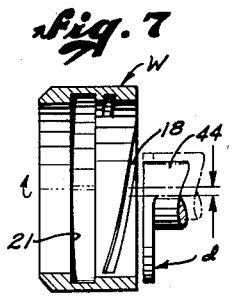

In reference to FIGURES 4-7, inclusive, FIGURE 4 shows the workpiece W' in its condition when it arrives at the spindle station 14 wherein a cylindrical internal surface 19 of desired diametrical dimension has been formed on the cylindrical sleeve forming the workpiece. As previously mentioned, a groove 21, for example, or other configurations may be formed prior to the groove cutting operation at the station 14. In this position of FIGURE 4, the tool 44 has its cutter end 47 adjacent to the workpiece W' but clear thereof so that the workpiece W' may be rotated into the station 14. As the shaft 31 rotates, the tool holder means 38 is extended, by the cam means 51, inwardly of the workpiece W', in the direction indicated by the arrow 102, a distance designated by the letter $d$, this distance being, as best seen in FIGURES 9 and 14, the linear offset distance of the cam groove 53 which is the predetermined distance of linear travel to position the tool cutter at the desired origin of cutting. At this time, the cam means 91 causes rotation of the shank 39 of the tool holder 38 to swing the cutter 47 eccentrically, relative to the axis 33, of the workpiece W and bite into the wall of the workpiece a distance (or depth) of $d'$. Keeping in mind that the workpiece W' is rotated during the operation of the device 10, a spiral groove 18 is formed as the tool 44 is retracted under the force of the cam 51' to return the cam follower to its original position (indicated in broken lines 59' of FIGURE 14). Therefore, as best seen in FIGURE 7, when the tool 44 has been retracted to the original position of FIGURE 4, the spiral groove 18 has been formed in the wall of the workpiece W. As best seen in FIGURE 8, a plurality of intermittent grooves like 18 may be formed wherein the rotation of the shaft 31 is in predetermined ratio to the rotation of the workpiece W. In FIGURE 8, for example, three grooves like 18 are formed on the annular surface 19 of the workpiece W. By proper co-relationship of the rotation of the shaft 31 to the rotation of the workpiece W', a desired plurality of grooves may be formed as required or by modification of the cam groove 53 of the cam means 51. Furthermore, by proper modification, which will be obvious to those skilled in the art, a continual spiral groove or thread may be formed. The rise 103 of the cam 92 may be modified, as can be the offset linear distance of the cam groove 53, to form a desired angular formation of a groove like 18 as required.

Furthermore, while the device of the instant invention has been described as cutting intermittent or continual internal grooves of the internal cylindrical surface of a workpiece, it is to be understood that the device may be used to cut external intermittent or continual grooves on the external surface of a cylindrical workpiece by suitable modifications and adjustments which will be apparent to those familiar with the art.

While the instant invention has been shown and described herein, in what is conceived to be the most practical and preferred embodiments, it is recognized that departures, other than those referred to above, may be made therefrom within the scope of the invention, which is theretofore not to be limited to the details disclosed herein, but is to be afforded the full scope of the claims.

What is claimed as new and desired to secure by Letters Patent is:

1. A cutting device comprising
   a support means,
   a shaft rotatably carried by said support means,
   a movable member on said support means,
   a single cutting tool carried by said movable member,
   a first cam interconnecting said shaft and said movable member
      for imparting rectilinear movement to said member
         for advancing said member toward a workpiece,
   and a second cam means interconnecting said shaft and said movable member
      for imparting rotation to said member,
         whereby said rectilinear movement and said rotation of said member predeterminately position said cutting tool for forming a cut in a workpiece.

2. A cutting device comprising
   a support member,
   a shaft rotatably mounted on said support member,
   a tool holding means on said member adjacent said shaft,
   a cutting tool held by said tool holding means,
   means supporting said tool holding means on said support member
      for rectilinear movement and for rotational movement,
   a first cam means interconnecting said shaft and said tool holding means
      for imparting said rectilinear movement thereto upon rotation of said shaft,
   and a second cam means interconnecting said shaft and said tool holding means
      for imparting said rotational movement thereto upon such rotation of said shaft,
         whereby said rectilinear movement and said rotational movement position said cutting tool for forming a predetermined cut in a workpiece.

3. A cutting device comprising
   a support,
   a shaft rotatably carried by said support,
   a tool holding member,
      said tool holding member having an arm,
   a cutting tool carried by said arm for imparting a cut in a workpiece,
   means supporting said tool holding member on said support with freedom for rectilinear movement,
   a cam means driven by said shaft for imparting reciprocative rectilinear movement to said tool holding member
      outwardly in one direction toward a workpiece and inwardly in the opposite direction away from such a workpiece,
   and an additional cam means driven by said shaft for imparting reciprocative rotation to said tool holding member
      for moving in one rotational direction upon said outward movement of said tool holding member
         so that said cutting tool clears said workpiece,
      and moving in the opposite rotational direction upon said inward movement of said tool holding member
         so that said cutting tool engages said workpiece to form a cut therein.

4. A cutting device comprising
   a support,
   a shaft rotatably carried by said support,
   a tool holding member,
      said tool holding member having an arm,
   a cutting tool carried by said arm,
   bearing means mounting said tool holding member on said support
      for sliding movement along a predetermined straight line,
      and for rotational movement of said tool holding member about said line as a rotational axis, for thereby imparting rectilinear movement and rotational movement to said arm, a first cam means interconnecting said shaft and said tool holding member for imparting said rectilinear movement thereto, and a second cam means interconnecting said shaft and said tool holding member for imparting said rotational movement thereto, for thereby predeterminately positioning said cutting tool.

5. A device as recited in claim 4 in which said first cam means includes a cam member carried by said shaft, means interconnecting said cam member and said shaft for causing said cam member and said shaft to rotate together, said cam member having a noncircular groove circumscribing the periphery thereof, and a cam follower received in said groove for movement in a direction as dictated by the confines of said groove upon rotation of said cam member, said cam follower being connected to said tool holding member for translating said movement of said cam follower into rectilinear movement of said tool holding member, said shaft and cam member being continually rotatable in one direction to effect rectilinear reciprocation of said tool holding member.

6. A device as recited in claim 5 in which said means connecting said cam member to said shaft is rotationally adjustable for thereby adjusting the position of said groove and controlling the rectilinear movement of said tool holding member.

7. A device as recited in claim 4 in which said predetermined line and the axis of said shaft are parallel.

References Cited by the Examiner
UNITED STATES PATENTS

| | | | |
|---|---|---|---|
| 1,815,012 | 7/31 | Schellenbach | 82—25 XR |
| 2,511,196 | 6/50 | Cuttat | 82—5 XR |
| 2,590,224 | 3/52 | Armstrong | 82—5 XR |
| 2,709,924 | 6/55 | Castelli | 82—5 XR |

WILLIAM W. DYER, Jr., *Primary Examiner.*

RICHARD H. EANES, Jr., *Examiner.*